US009010671B2

(12) United States Patent
Yeh

(10) Patent No.: US 9,010,671 B2
(45) Date of Patent: Apr. 21, 2015

(54) FISHING REEL

(71) Applicant: Shih-Yuan Yeh, Taichung (TW)

(72) Inventor: Shih-Yuan Yeh, Taichung (TW)

( * ) Notice: Subject to any disclaimer, the term of this patent is extended or adjusted under 35 U.S.C. 154(b) by 204 days.

(21) Appl. No.: 13/908,133

(22) Filed: Jun. 3, 2013

(65) Prior Publication Data

US 2014/0353414 A1    Dec. 4, 2014

(51) Int. Cl.
*A01K 89/01*    (2006.01)
*A01K 89/033*    (2006.01)
*A01K 89/0155*    (2006.01)

(52) U.S. Cl.
CPC ......... *A01K 89/033* (2013.01); *A01K 89/01555* (2013.01)

(58) Field of Classification Search
USPC ........................................................ 242/288
See application file for complete search history.

(56) References Cited

U.S. PATENT DOCUMENTS

| 4,593,866 | A | * | 6/1986 | Moosberg et al. | 242/288 |
| 4,779,814 | A | * | 10/1988 | Uetsuki et al. | 242/288 |
| 4,830,308 | A | * | 5/1989 | Puryear | 242/288 |
| 5,636,804 | A | * | 6/1997 | Jeung | 242/288 |
| 5,692,693 | A | * | 12/1997 | Yamaguchi | 242/288 |
| 5,950,949 | A | * | 9/1999 | Cockerham | 242/289 |
| 6,065,700 | A | * | 5/2000 | Kim | 242/288 |
| 6,315,228 | B1 | * | 11/2001 | Sato | 242/312 |
| 2002/0063181 | A1 | * | 5/2002 | Yamaguchi | 242/286 |
| 2004/0159731 | A1 | * | 8/2004 | Moosberg | 242/288 |
| 2004/0182961 | A1 | * | 9/2004 | Moosberg | 242/288 |
| 2012/0234955 | A1 | * | 9/2012 | Yeh et al. | 242/288 |
| 2013/0306777 | A1 | * | 11/2013 | Ikebukuro | 242/288 |

* cited by examiner

*Primary Examiner* — Emmanuel M Marcelo
(74) *Attorney, Agent, or Firm* — patenttm.us

(57) ABSTRACT

A fishing reel has a reel body and an adjusting device. The reel body has a spool that is made of metal. The adjusting device has an adjusting button, an adjusting base and a magnetic set. The adjusting button has an adjusting structure being spiral, facing the spool and forming a step between a highest part and a lowest part of the adjusting structure. The adjusting base has a coordinating portion being spiral, facing the adjusting structure and forming a step between a highest part and a lowest part of the coordinating portion. The magnet set is mounted on the adjusting base and faces the spool.

16 Claims, 6 Drawing Sheets

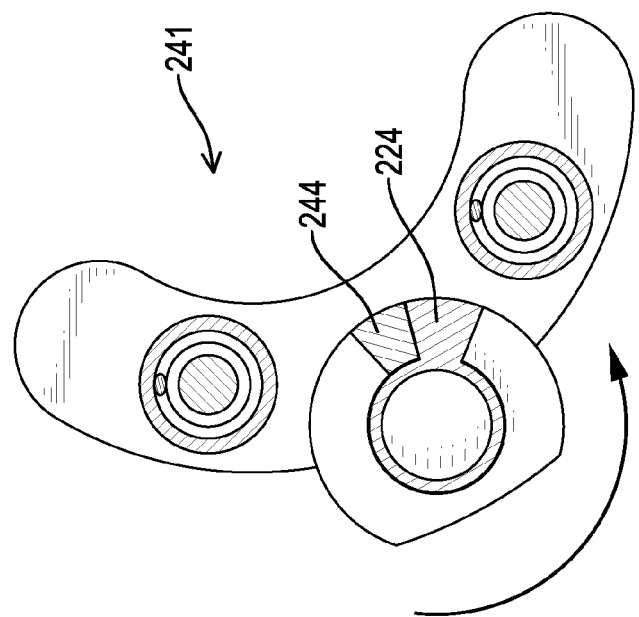
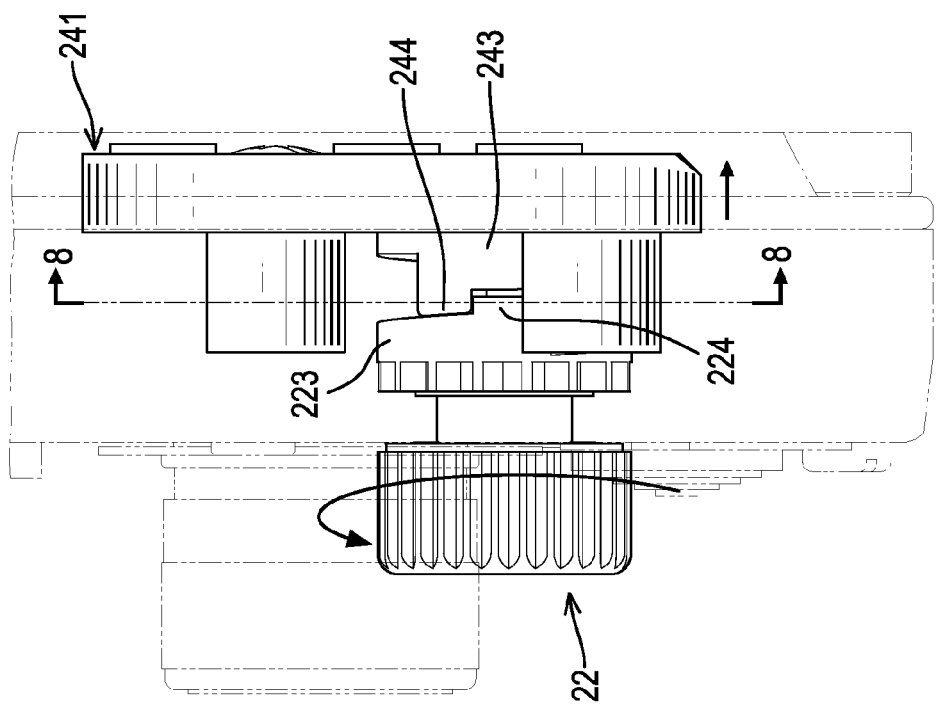

FISHING REEL

BACKGROUND OF THE INVENTION

1. Field of the Invention

The present invention relates to a fishing reel, and more particularly to a fishing reel with a magnetic adjusting device to decrease the rotating speed of a spool.

2. Description of Related Art

A conventional fishing reel comprises two covers, a handle, and a spool. The covers are spaced from each other. The handle is rotatably combined with one of the covers at a side opposite to the other cover. The spool is rotatably mounted between the covers. The spool is linked with the handle, such that the spool can be rotated by the handle.

In use, a fishing line is wound around the spool and bait is hooked on an end of the fishing line. When a user casts the fishing reel with hooked bait, the spool rotates freely and releases the fishing line quickly to cast the bait far or deeply. The user can rotate the handle to further rotate the spool in reverse to retrieve the fishing line. When the bait is dropped into the water or hit on the underwater ground, a pulling force from the bait is reduced immediately. However, the spool still keeps rotating quickly, such that the fishing line is released too much. When the user rotates the handle to rotate the spool in reverse to retrieve the fishing line, the fishing line may be easily entwined around the spool.

To solve the problem, the user always decelerates or stops the spool by touching the rotating spool with the thumb. However, decelerating the spool by thumb is unsafe for the user. To overcome the shortcoming, the present invention provides a fishing reel with a magnetic adjusting device to obviate the mentioned problem.

SUMMARY OF THE INVENTION

The main objective of the present invention is to provide a fishing reel to solve the aforementioned problem.

The fishing reel comprises a reel body and an adjusting device. The reel body comprises a handle cover, a handle rotatably combined with the handle cover, an adjusting cover being parallel with the handle cover and comprising two sides, and a spool rotatably connected between the handle cover and the adjusting cover; the spool is made of metal, is linked with the handle.

The adjusting device is mounted between the handle cover and the spool and comprises a base, an adjusting button, an adjusting base, and a magnet set. The base is mounted on one of the sides of the adjusting cover that faces the spool. The adjusting button is rotatably mounted through the base and comprises an adjusting structure, wherein the adjusting structure is spiral, faces the spool and comprises a highest part, a lowest part, and a step formed between the highest part and the lowest part of the adjusting structure. The adjusting base is mounted on the base moveably relative to the adjusting button and comprises a coordinating portion, wherein the coordinating portion is spiral, faces the adjusting structure and comprises a highest part abutting the adjusting structure, a lowest part, and a step formed between the highest part and the lowest part of the coordinating portion. The magnet set is mounted on the adjusting base and faces the spool.

The highest part of the coordinating portion abuts the adjusting structure. When the adjusting button is rotated, the adjusting structure is rotated relative to the coordinating portion, such that the highest part of the coordinating portion can abut the adjusting structure at different positions to adjust the distance between the adjusting base and the spool. When the highest part of the coordinating portion gradually approaches the highest part of the adjusting structure, the distance between the spool and the adjusting base is decreased gradually, and the resisting force affecting the spool is enhanced gradually. When the resisting force is enhanced, the rotating speed of the spool is decreased. Therefore, the spool can be decelerated without touching the spool with the thumb.

BRIEF DESCRIPTION OF THE DRAWINGS

FIG. 7 is an operational partial side view of the fishing reel in FIG. 1; and FIG. 8 is a cross sectional front view across line 8-8 in FIG. 7.

DETAILED DESCRIPTION OF PREFERRED EMBODIMENT

Figure 1:
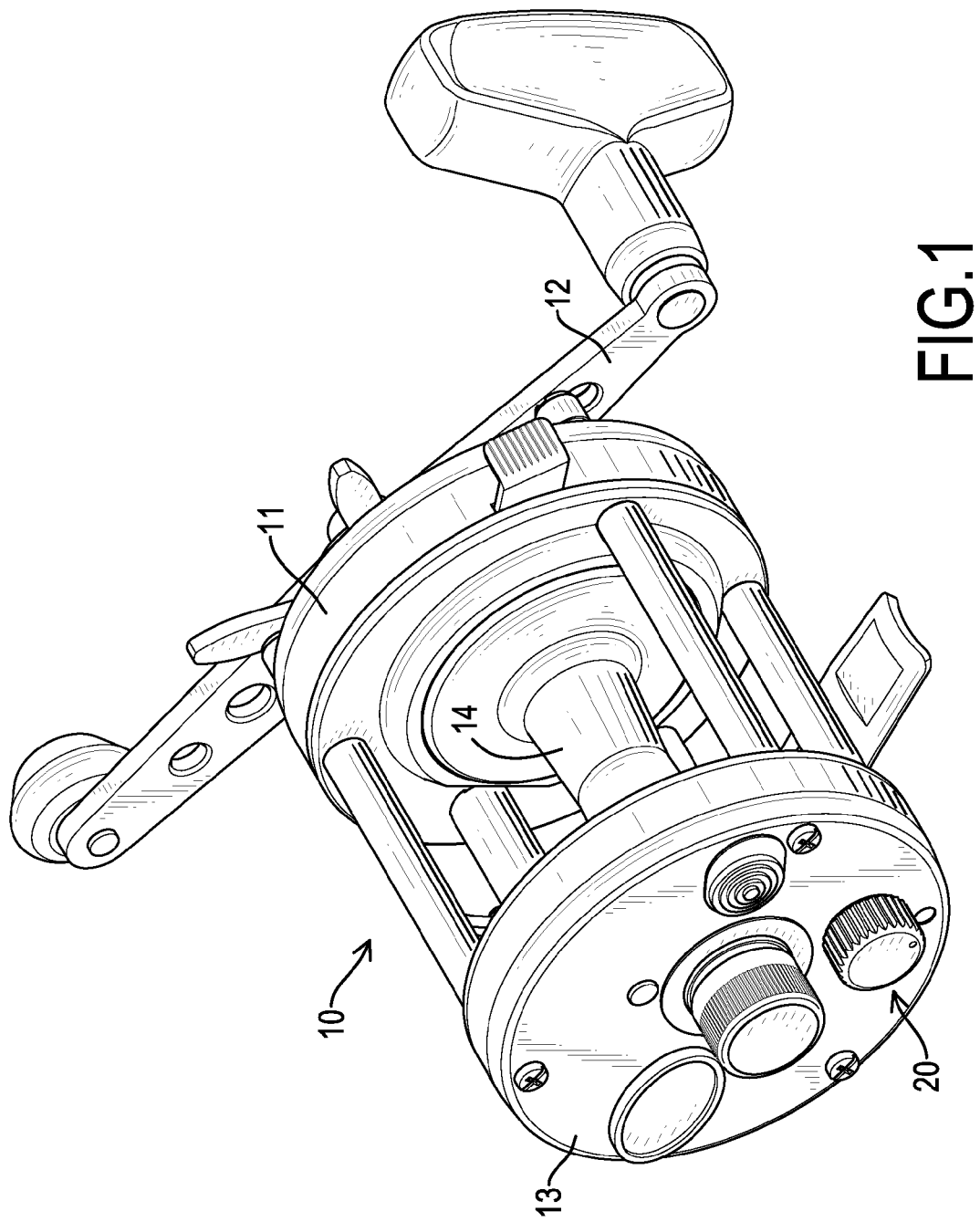
FIG. 1 is a perspective view of a preferred embodiment of a fishing reel in accordance with the present invention.
Figure 2:
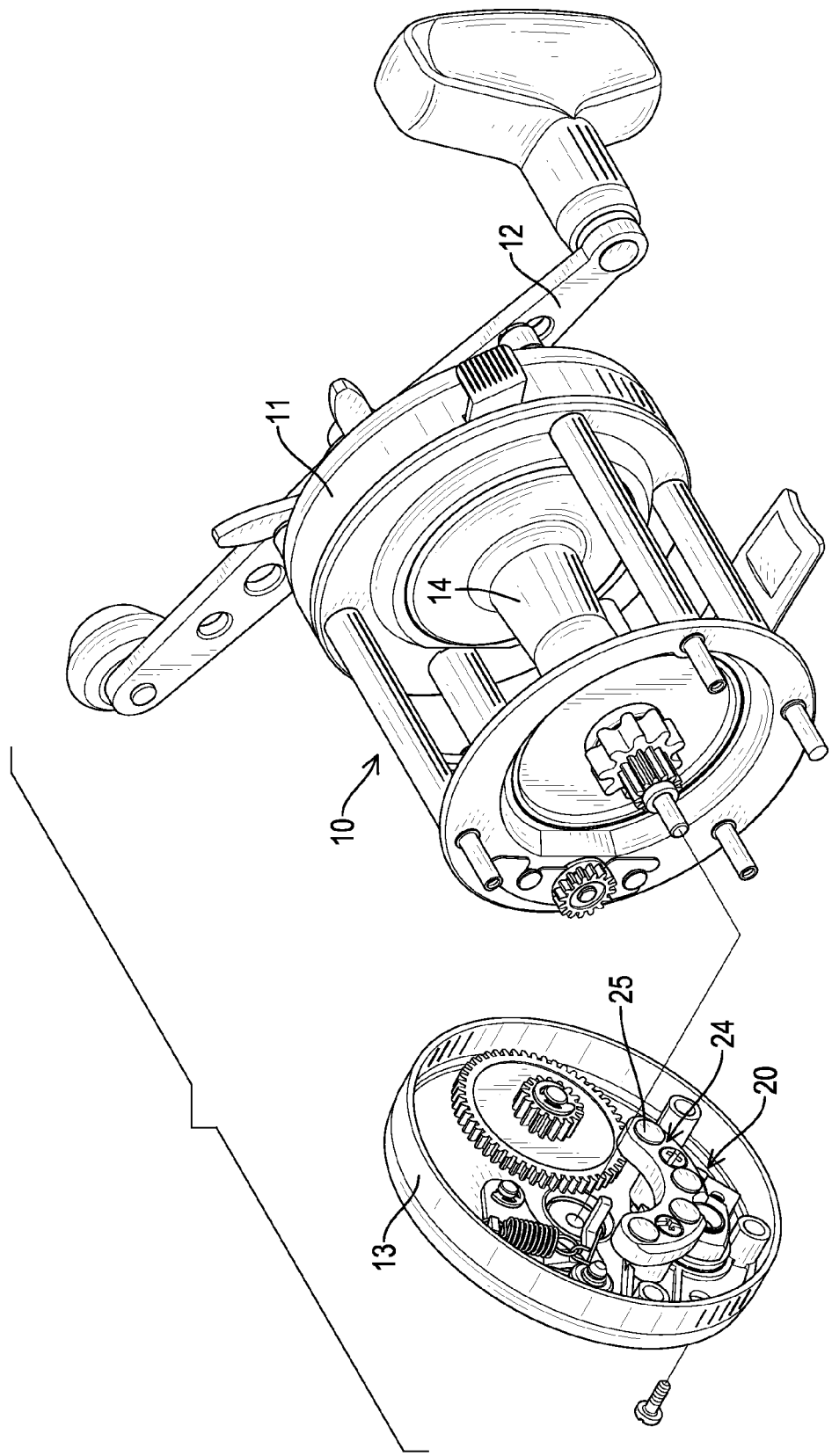
FIG. 2 is a partially exploded perspective view of the fishing reel in FIG. 1.

With reference to FIGS. 1 to 4, a preferred embodiment of a fishing reel with a magnetic adjusting device in accordance with the present invention comprises a reel body 10 and an adjusting device 20.

The reel body 10 comprises a handle cover 11, a handle 12, an adjusting cover 13, and a spool 14. The handle 12 is rotatably combined with the handle cover 11. The adjusting cover 13 is parallel with the handle cover 11. The spool 14 is rotatably mounted between the handle cover 11 and the adjusting cover 13 and is linked with the handle 12. The spool 14 is made of metal. When the handle 12 is rotated relative to the handle cover 11, the spool 14 can be controlled by the handle 12 to rotate between the handle cover 11 and the adjusting cover 13.

The adjusting device 20 is mounted between the adjusting cover 13 and the spool 14 and comprises a base 21, an adjusting button 22, an engaging unit 23, an adjusting base 24 and a magnet set 25. The base 21 is mounted on a side of the adjusting cover 13 that faces the spool 14, and the base 21 comprises a button trough 211 and an engaging trough 212. Both the button trough 211 and the engaging trough 212 are formed in the base 21 and communicate with each other. The adjusting button 22 is rotatably mounted in the button trough 211 and comprises an adjusting axis 221, multiple button teeth 222, an adjusting structure 223, and an abutting block 224. The adjusting axis 221 is mounted through the base 21 and the adjusting cover 13 and protrudes out of a side of the adjusting cover 13 opposite to the spool 14. The button teeth 222 are arranged around a periphery of the adjusting axis 221. The adjusting structure 223 is mounted on the sides of the button teeth 222 and around the periphery of the adjusting axis 221. The adjusting structure 223 is spiral along a longitudinal direction of the adjusting axis 221, wherein a step is formed between a highest part and a lowest part of the adjusting structure 223. The abutting block 224 is mounted on the highest part of the adjusting structure 223.

The engaging unit 23 is mounted in the engaging trough 212, moveably engages the adjusting button 22 and comprises a plug 231, a spring 232, and an engaging ring 233. The plug 231 is mounted in the engaging trough 212. The spring 232 is mounted around the plug 231 and abuts the engaging trough 212. The engaging ring 233 is mounted around the plug 231. A side of the engaging ring 233 abuts the spring 232, and the other side of the engaging ring 233 abuts the button teeth 222 of the adjusting button 22. When a user rotates the adjusting button 22 by the adjusting axis 221, the button teeth 222 compress the engaging ring 233 by the dentate structure of the button teeth 222. In the meantime, the engaging ring 233 is also forced by an elastic force of the spring 232. Accordingly, the engaging ring 233 moves back and forth relative to the button teeth 222 in the engaging trough 212.

The adjusting base 24 is mounted on the side of the base 21 moveably parallel with the longitudinal direction of the adjusting button 22 and comprises a base body 241, two adjusting units 242, a coordinating portion 243, and a coordinating block 244. The base body 241 is mounted on the side of the base 21 that faces the spool 14. Each adjusting unit 242 is mounted in the base body 241, wherein an end of the adjusting unit 242 is mounted through the base body 241 and combined with the base 21, and the other end of the adjusting unit 242 resiliently abuts the base body 241. Preferably, each adjusting unit 242 is combined with the base body 241 and the base 21 by a bolt 2421. Two compression springs 2422 are each mounted between and abut the bolt 2421 and the base body 241. The coordinating portion 243 is mounted on a side of the base body 241 that faces the adjusting button 22 and faces the adjusting structure 223. The coordinating portion 243 is spiral, wherein a step is formed between a highest part and a lowest part of the coordinating portion 243. The coordinating portion 243 abuts the abutting block 224. The coordinating block 244 protrudes on the highest part of the coordinating portion 243 and abuts the adjusting structure 223. The magnet set 25 is mounted on a side of the adjusting base 24 that faces the spool 14. Preferably, the magnet set 25 comprises four magnets.

With reference to FIGS. 3 to 6, the coordinating block 244 abuts the lowest part of the adjusting structure 223 and the abutting block 224 also abuts the lowest part of the coordinating portion 243. In this situation, the distance between the adjusting base 241 and the spool 14 is maximal, and a magnetic flux that passes through the spool 14 from the magnet set 25 is minimum.

Figure 3:
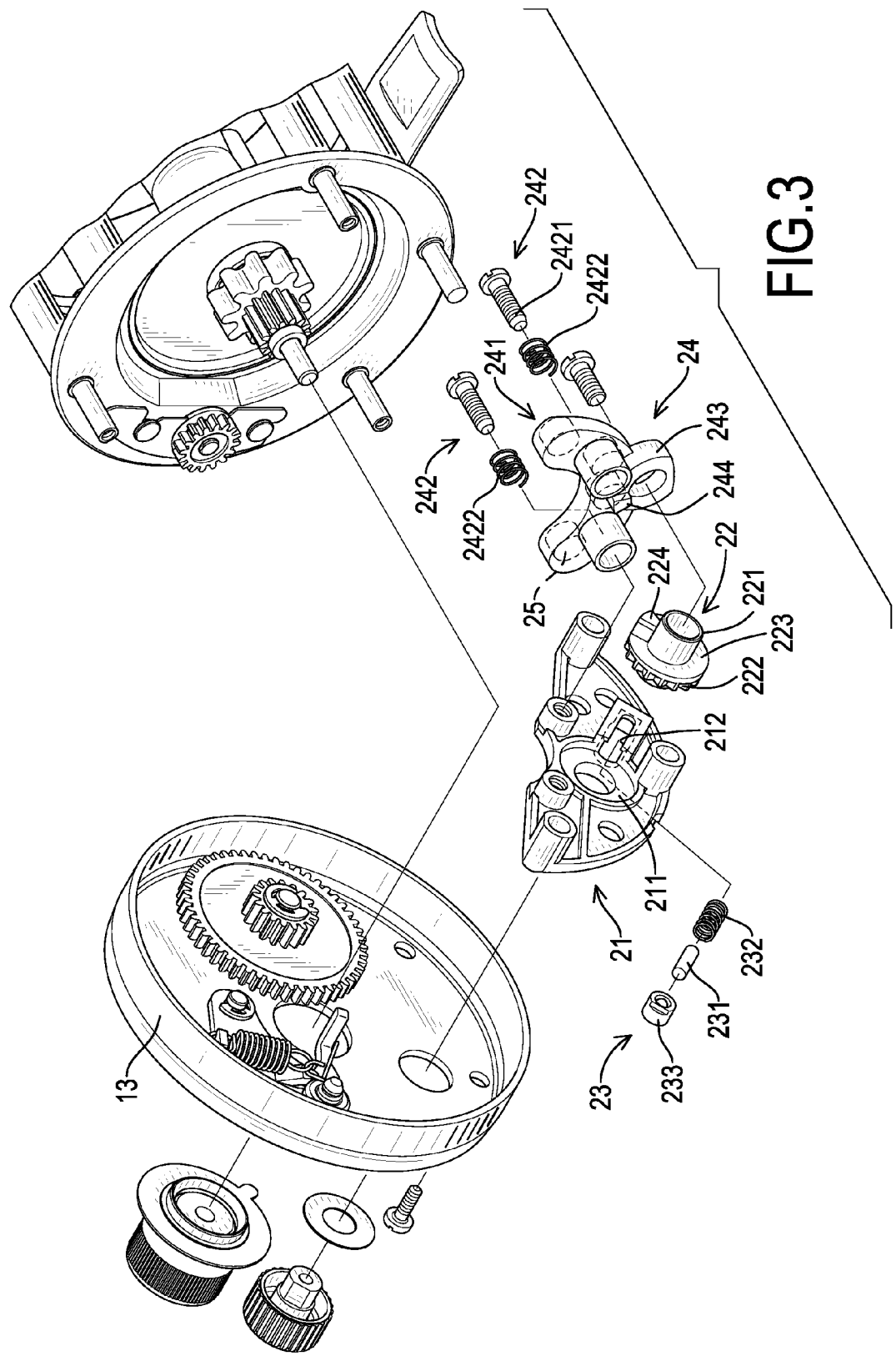
FIG. 3 is a partially exploded perspective view of the fishing reel in FIG. 1.
Figure 4:
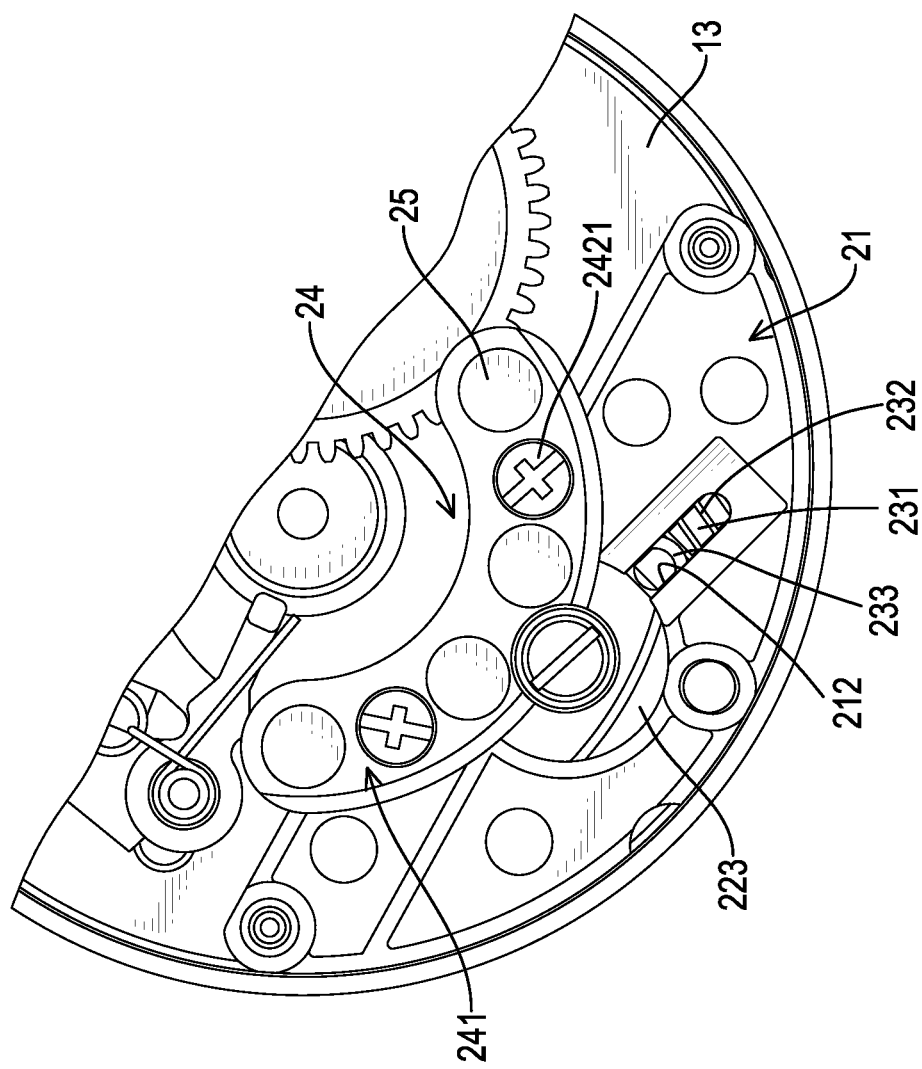
FIG. 4 is a partial side view of the fishing reel in FIG. 1.
Figure 6:
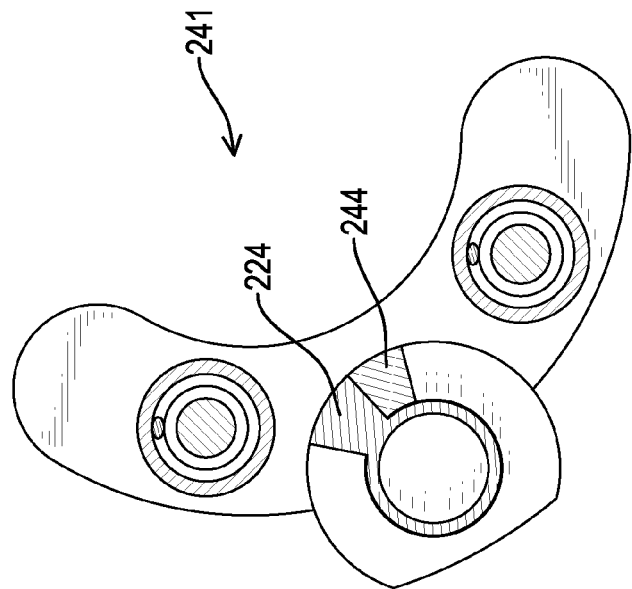
FIG. 6 is a cross sectional front view across line 6-6 in FIG. 5.
Figure 5:
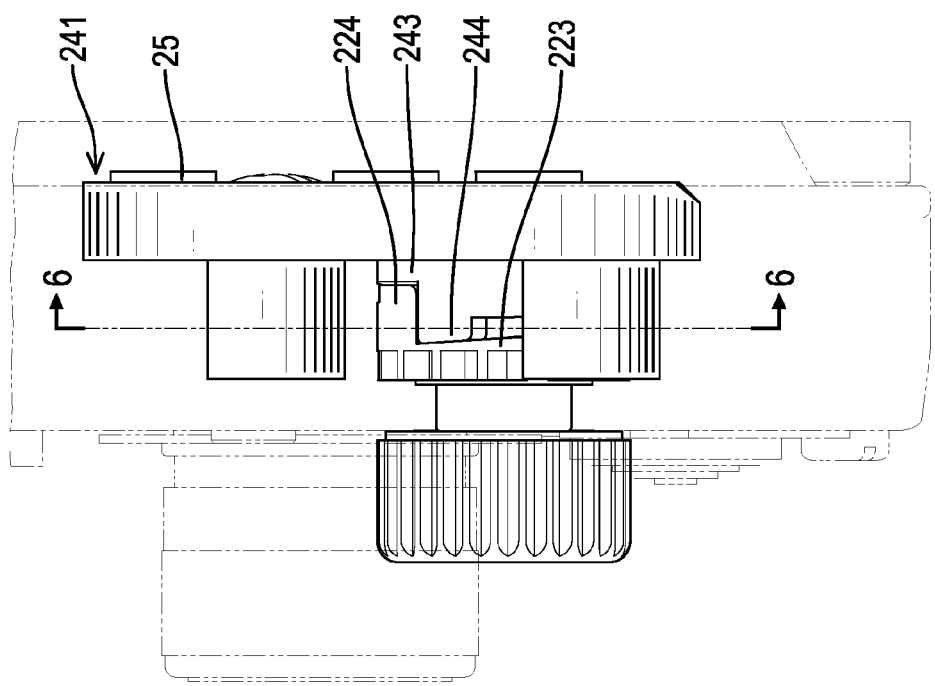
FIG. 5 is an operational partial side view of the fishing reel in FIG. 1.

The adjusting base 24 is forced by the elastic force of the adjusting unit 242, such that although the adjusting base 24 is combined with the base 21, the adjusting base 24 still moves relative to the base 21. With reference to FIGS. 3, 7 and 8, when a user rotates the adjusting button 22, the adjusting structure 223 is rotated relative to the coordinating portion 243. When the abutting block 224 moves gradually toward the highest part of the coordinating portion 243, the highest part of the adjusting structure 223 also moves gradually toward the highest part of the coordinating portion 243, such that the adjusting base 241 moves gradually toward the spool 14. When the abutting block 224 and the coordinating block 244 abut each other, the distance between the adjusting base 24 and the spool 14 is minimum, and the magnetic flux that passes through the spool 14 from the magnet set 25 is maximal. In the meantime, the abutting block 224 that abuts the coordinating block 244 can provide a stopping effect, such that the adjusting button 22 is kept from rotating idly relative to the coordinating portion 243.

In the following description, the range within which the magnetic flux affects the spool 14 is defined as a magnetic flux range; the part of the spool 14 that is approaching the magnetic flux range is defined as an approaching part; and the part of the spool 14 that is leaving the magnetic flux range is defined as a leaving part. When the spool 14 is rotated, the approaching part approaches the magnetic flux range to increase the magnetic flux passing through the approaching part and the leaving part leaves the magnetic flux range to decrease the magnetic flux passing through the leaving part. Then, according to the Lenz's law, after the magnetic flux passes through the approaching part is increased, the approaching part induces opposing currents to resist the "increased" magnetic flux; after the magnetic flux passed through the leaving part is decreased, the leaving part induces the other opposing currents to compensate the "decreased" magnetic flux. The spool 14 will be forced with a resisting force that is generated from a cross product denoted by the magnetic force and the two opposing currents, wherein the magnetic force affects the spool 14 in the magnetic flux range, and the directions of the two opposing currents in the magnetic flux range are in the same direction.

The magnetic flux passing through the spool 14 from the magnet set 25 can be adjusted by changing the distance between the spool 14 and the magnet set 25. When the magnet set 25 approaches the spool 14, the magnetic flux passing through the spool 14 is increased and the magnetic force affecting the spool 14 in the magnetic flux range is also increased. After the magnetic force affecting the spool 14 is increased, the resisting force that is generated from the cross product denoted by the magnetic force and the opposing currents is also increased. Then, the rotating speed of the spool 14 is decreased. Alternatively, when the magnet set 25 departs from the spool 14, the magnetic force affecting the spool 14 is decreased to make the resisting force increase, such that the rotating speed of the spool 14 is increased. As a result, the user can decelerate the spool 14 without touching the spool 14 with the thumb, such that the safety is enhanced for the user.

On the other hand, when the adjusting button 22 is rotated, the engaging unit 23 moves relative to the button teeth 222 back and forth in the engaging trough 212. After the adjustment is completed, the engaging unit 23 engages between the adjacent button teeth 222 to provide an engaging effect for the adjusting button 22. The adjusting button 22 stops rotating until the user rotates the adjusting button 22 again. When the adjusting button 22 is engaged, the magnetic force between the spool 14 and the magnet set 25 is fixed. As a result, the fishing reel is convenient for use.

What is claimed is:

1. A fishing reel comprising:
   a reel body comprising
      a handle cover;
      a handle rotatably combined with the handle cover;
      an adjusting cover being parallel with the handle cover and comprising two sides; and
      a spool made of metal, rotatably connected between the handle cover and the adjusting cover, the spool linked with the handle; and
   an adjusting device mounted between the handle cover and the spool and comprising
      a base mounted on one of the sides of the adjusting cover that faces the spool;
      an adjusting button rotatably mounted through the base and comprising an adjusting structure, wherein the adjusting structure is spiral, faces the spool and comprises
         a highest part;
         a lowest part; and
         a step formed between the highest part and the lowest part of the adjusting structure;

an adjusting base mounted on the base moveably relative to the adjusting button and comprising a coordinating portion, wherein the coordinating portion is spiral, faces the adjusting structure and comprises
- a highest part abutting the adjusting structure;
- a lowest part; and
- a step formed between the highest part and the lowest part of the coordinating portion; and a magnet set mounted on the adjusting base and facing the spool.

2. The fishing reel as claimed in claim 1, wherein the adjusting button further comprises an abutting block protruding on the highest part of the adjusting structure; and the adjusting base further comprises a coordinating block protruding on the highest part of the coordinating portion and abutting the adjusting structure.

3. The fishing reel as claimed in claim 2, wherein the adjusting base is combined with the base by two bolts, and two compression springs are each mounted between and abut the bolt and the adjusting base.

4. The fishing reel as claimed in claim 3, wherein the magnet set comprises four magnets, wherein the magnets of the magnet set are mounted on the adjusting base and face the spool.

5. The fishing reel as claimed in claim 4, wherein the adjusting button further comprises multiple button teeth arranged annularly on a side of the adjusting structure opposite to the coordinating portion; and the adjusting device further comprises an engaging unit mounted in the base, the engaging unit selectively engaging between the button teeth and being moveable back and forth relative to the button teeth.

6. The fishing reel as claimed in claim 5, wherein the engaging unit comprises a spring and an engaging ring, the spring mounted in the base and abutting the base, and the engaging ring mounted on the spring and selectively engaging between the button teeth.

7. The fishing reel as claimed in claim 6, wherein the engaging unit further comprises a plug mounted into the spring and through the engaging ring.

8. The fishing reel as claimed in claim 3, wherein the adjusting button further comprises multiple button teeth arranged annularly on a side of the adjusting structure opposite to the coordinating portion; and the adjusting device further comprises an engaging unit mounted in the base, the engaging unit selectively engaging between the button teeth and being moveable back and forth relative to the button teeth.

9. The fishing reel as claimed in claim 8, wherein the engaging unit comprises a spring and an engaging ring, the spring mounted in the base and abutting the base, and the engaging ring mounted on the spring and selectively engaging between the button teeth.

10. The fishing reel as claimed in claim 9, wherein the engaging unit further comprises a plug mounted into the spring and through the engaging ring.

11. The fishing reel as claimed in claim 2, wherein the adjusting button further comprises multiple button teeth arranged annularly on a side of the adjusting structure opposite to the coordinating portion; and the adjusting device further comprises an engaging unit mounted in the base, the engaging unit selectively engaging between the button teeth and being moveable back and forth relative to the button teeth.

12. The fishing reel as claimed in claim 11, wherein the engaging unit comprises a spring and an engaging ring, the spring mounted in the base and abutting the base, and the engaging ring mounted on the spring and selectively engaging between the button teeth.

13. The fishing reel as claimed in claim 12, wherein the engaging unit further comprises a plug mounted into the spring and through the engaging ring.

14. The fishing reel as claimed in claim 1, wherein the adjusting button further comprises multiple button teeth arranged annularly on a side of the adjusting structure opposite to the coordinating portion; and the adjusting device further comprises an engaging unit mounted in the base, the engaging unit selectively engaging between the button teeth and being moveable back and forth relative to the button teeth.

15. The fishing reel as claimed in claim 14, wherein the engaging unit comprises a spring and an engaging ring, the spring mounted in the base and abutting the base, and the engaging ring mounted on the spring and selectively engaging between the button teeth.

16. The fishing reel as claimed in claim 15, wherein the engaging unit further comprises a plug mounted into the spring and through the engaging ring.

* * * * *